Aug. 13, 1963     A. E. ROGILLIO     3,100,741
ALCOHOL DEHYDRATION PROCESS
Filed Aug. 7, 1957
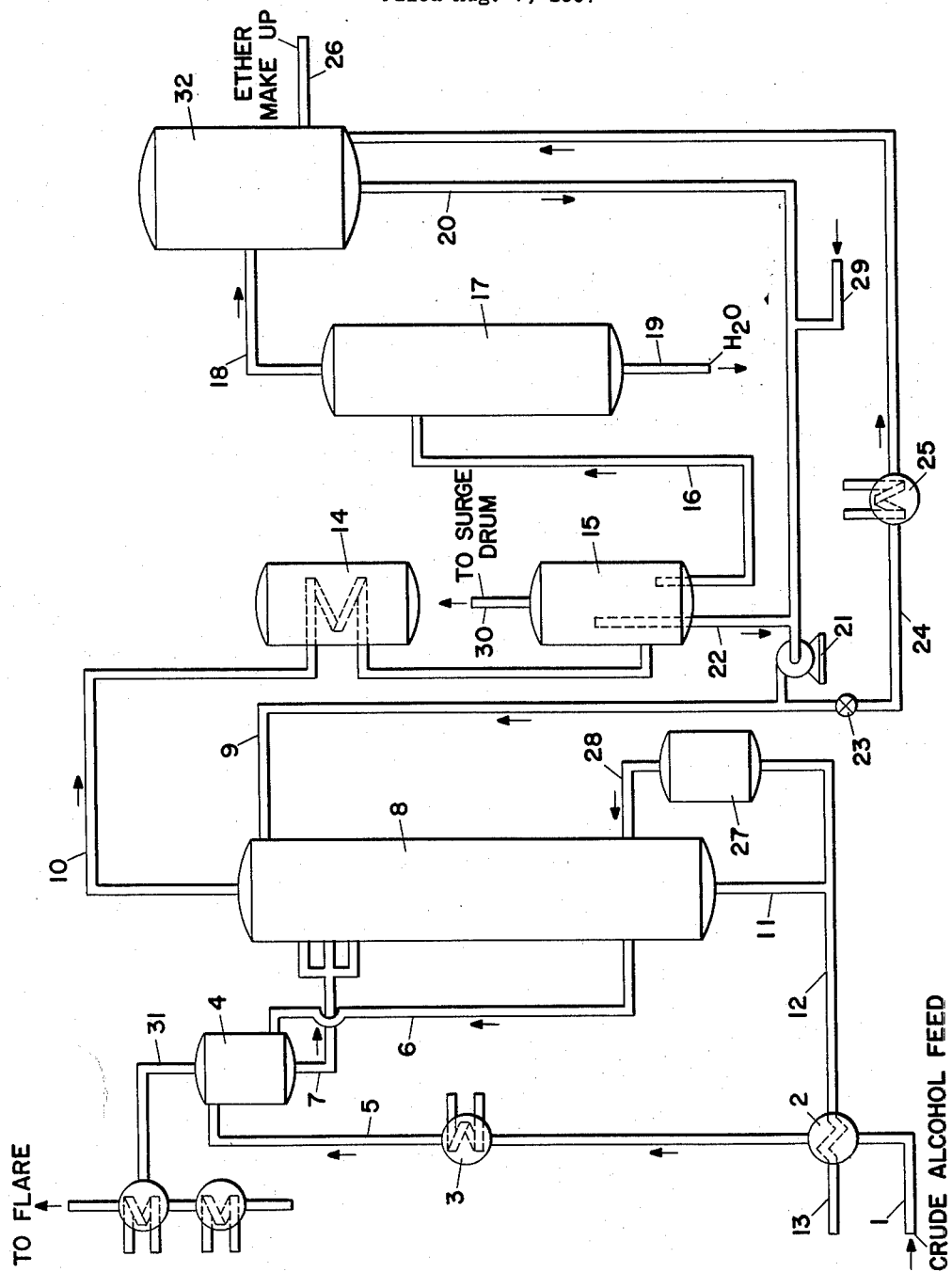
Archie Edward Rogillio     Inventor
By *Seymour Stahl* Attorney / # 3,100,741
ALCOHOL DEHYDRATION PROCESS
Archie Edward Rogillio, Baker, La., assignor to Esso Research and Engineering Company, a corporation of Delaware
Filed Aug. 7, 1957, Ser. No. 676,790
5 Claims. (Cl. 202—42)

This invention relates to a continuous cyclic process for dehydrating lower molecular weight alcohols and particularly isopropyl alcohol obtained by hydrating propylene either by direct or indirect hydration techniques. More particularly this invention relates to a process for dehydrating isopropyl alcohol by fractional azeotropic distillation in the presence of large amounts of a low molecular weight ether and especially diethyl ether. Still more specifically this invention relates to certain improvements in the azeotropic distillation of isopropyl alcohol whereby operating difficulties resulting in low purity alcohol are reduced or eliminated and whereby higher purity alcohol products are produced at high throughput rates.

One conventional continuous cyclic process for the dehydration of isopropyl alcohol comprises passing a wet isopropyl alcohol feed to an upper portion of a fractionating column containing, for example, from 40–60 plates. The water content of the alcohol feed may of course vary; however, it has been found desirable to employ a substantial azeotropic mixture of isopropyl alcohol and water, e.g. 91 vol. percent alcohol, such as obtained as a constant boiling mixture from atmospheric distillation. Diethyl ether, in this process, is concomitantly fed into the fractionating tower near the top, preferably over the last plate, and in an amount of from 5–16 vols. per volume of alcohol feed. The amount of ether is preferably controlled to maintain the temperature near the bottom of the tower at a desired level. The ratio of ether to alcohol feed will in part determine the degree of purity obtained in the final alcohol product. For example, the unit may be adjusted to produce high purity isopropanol of 99.9% which is suitable for medicinal and perfume preparations, or it may be adjusted to yield 97–98% purity product which is suitable as a gasoline additive. In any event, the purity is a factor of ether to alcohol feed ratio, degree of fractionation, e.g. number of plates, temperature and pressure. Accordingly, alcohol product of the purity desired is recovered as bottoms from the fractionating column. Ether is continuously taken overhead, condensed, passed to a decanter where the ether is separated from water and recycled as reflux to the top of the fractionating tower. The water recovered usually contains substantial amounts of dissolved ether and may be heat stripped to recover the diethyl ether to be eventually returned to the fractionating tower, preferably via the ether reflux line.

The aforementioned briefly described alcohol dehydration system has several serious drawbacks resulting in low purity alcohol which has to be redistilled.

It has been found when operating in accordance with the above description, there occurs incipient flooding in the dehydration or fractionating tower which results in dumping of the tower and loss of azeotropic distillation. The tower floods because phase separation between ether and water is lost in the decanter, with the result that the reflux ether stream from the decanter to the tower contains too high a water content to permit azeotropic distillation. When the system is working properly, a spread of 3–6° F. prevails between the top 4 or 5 tower plates. As the cyclic process continues, water and other impurities, such as acetone, build up in the tower resulting in the aforenoted incipient flooding which can be recognized by reduction in the temperature difference between the top 4 or 5 plates. For example, as the run progresses for a period of time, usually from 6 to 12 hours, the 3–6° F. difference becomes less than 1° F. indicating incipient flooding. If this condition is not corrected, severe flooding will follow, whereby off-test alcohol product is produced, tower dumping is experienced, and in general the operating conditions become unstable. Tower dumping is a term which defines the condition occurring when the vapor is insufficient to support the liquid and the liquid falls through the bubble caps or other holes in the plates. Normally vapor is passing upwardly through these bubble caps.

It is an object of this invention to reduce or eliminate the amount of off-test products of low molecular weight alcohols in the dehydration thereof.

It is a further object of this invention to reduce tower flooding, tower dumping and other unstable operating conditions in the azeotropic fractionation of lower molecular weight alcohols.

It is also an object of this invention to provide a novel continuous cyclic process for the production of dehydrated isopropanol of high quality with constant high throughput rates.

Still other objects of this invention will become apparent from a more detailed description which follows.

The present invention will be described in more detail with reference to the accompanying drawing which discloses a simplified flow diagram of an isopropanol dehydration unit.

A crude aqueous isopropanol containing approximately 9 vol. percent water is passed via line 1 through preheaters 2 and 3 wherein the feed is raised to a temperature generally between 250°–370° F., preferably 300°–330° F. The hot feed is then passed to a deaeration tower 4 via line 5. The deaeration prevents or minimizes the formation of ether peroxides and other oxygenated compounds which would effect the final isopropanol quality. Moreover, the possibility of explosive air-ether mixtures in the overhead condenser system is avoided. A small portion of the vapor from the dehydration tower is passed via line 6 to the deaerator 4 to act as a stripping vapor. Air and alcohol plus small quantities of impurities, such as acetone, are taken overhead via line 31. Isopropanol and water are then condensed, cooled and returned to feed storage. The noncondensable portion which is primarily air is sent to a flare stack. Deaerated feed is then passed via line 7 into the dehydration tower 8 preferably at about the 39th to 47th plates. Diethyl ether preheated to about 225–300° F., preferably 250–275° F. is admitted to tower 8 via line 9 at the upper portion of the tower, preferably around the top plate. A pressure of from about 200–240 p.s.i.g. and preferably 200–205 p.s.i.g. is maintained within the tower. The temperature gradient between the bottom and top of the tower is maintained about 80° F.; the temperature near the bottom being about 340° F., while that at the top being about 260° F. The temperatures depend on the operating pressure.

A major portion of the water which enters with the isopropanol feed is removed overhead from tower 8 through line 10 as essentially an ethyl ether water azeotrope while the dry alcohol and any acetone not taken overhead is removed as tower bottoms product via line 11. The hot anhydrous alcohol is then passed via line 12 through heat exchanger 2 wherein it is cooled and recovered via line 13. The ether-water mixture taken overhead via line 10 is passed first through a condenser 14 then to a decanter 15. Water containing minor amounts of ether is withdrawn from the bottom of said decanter via line 16 and passed to an ether stripping tower 17. The ether stripping tower may be maintained at temperatures of from 220 to 235° F. Substantially all of the ether is recovered overhead via line 18 and the water plus small amounts of acetone rejected as bottoms via line 19.

In a commercial operation there would preferably be a surge drum, not shown, located between the decanter and an ether purge drum whereby the pressure within the system is controlled by pressuring or depressuring the surge drum with an inert gas, usually crude ethylene. For a detailed description of where the surge drum and purge drum are located, reference may be had to U.S. patent to W. E. Catterall, 2,787,586. Since this portion of the system does not relate to the heart of the invention, further reference thereto will not be made. The recovered ether is preferably passed to an ether storage tank 32 and recirculated via line 20 and pump 21 into the ether reflux line 9. The bulk of the ether separated by the decanter 15 is passed via line 22 through pump 21 into line 9 for recycle or reflux to the top of the tower. A portion of the ether may be passed by opening valve 23 through line 24, heat exchanger 25 into ether storage tank 32. Make-up ether may be admitted in any suitable place in the system; however, it is preferable to add the make-up ether into the storage tank via line 26. Tower 8 also preferably embodies a conventional reboiler system with reboiler 27 and recycle line 28.

In accordance with this invention minor amounts of fresh anhydrous ether are added to the ether reflux after water is separated from the ether such as in decanter 15. The anhydrous ether may be added to line 20 prior to pump 21 through line 29 or, if desired, directly into the tower so that it mixes with the ether reflux. The amount added is preferably at a rate of from 0.01 to 5 volume percent based to total ether reflux. Above these amounts no substantial advantage is obtained. While the anhydrous ether may be added continuously, it is preferable to add it at periodic intervals such as every 5–9 hours. For example, the temperature within the dehydrator may be observed and when the difference between the last 5 or 6 plates drops below 2° F. the ether may be added to thwart flooding and to permit the maintenance of high throughput rates without sacrifice in product quality.

To set forth the general and preferred operating conditions for the dehydration of isopropanol in accordance with this invention, reference may be had to the following table.

TABLE I

|  | General preferred conditions | Specific embodiment |
|---|---|---|
| Tower conditions: |  |  |
| Number of plates (may vary) |  | 54 |
| Temperature, ° F.: |  |  |
| Top | 260 to 280 | 260 |
| Bottom | 340 to 360 | 340 |
| Pressure, p.s.i.g.: |  |  |
| Top | 200 to 235 | 200 |
| Bottom | 205 to 240 | 205 |
| Feed ratios: |  |  |
| Crude alcohol (Line 1), gals./hr | 3,000 to 6,400 | 5,000 |
| Ether (Line 9), gals./hr | 47,000 to 54,000 | 50,000 |
| Make-up ether (Line 26), gals./day | 588 to 1,728 | 1,000 |
| Ether stripping tower conditions: |  |  |
| Temperature, ° F. | 220 to 235 | 225 |
| Pressure, p.s.i.g. | 8 to 10 | 9 |

By resort to this invention high throughput rates and high purity product may be maintained.

As an example of the advantageous results occurring from this invention, comparative tests were made with the following results.

*Example I*

Employing the specific conditions noted in Table I above, the maximum feed rate to the dehydrator in order to maintain 98.0 volume percent isopropanol was 4000 gals./hr. In order to produce 99.9 volume percent isopropanol it was necessary to cut back to a feed rate of 3000 gals./hr. In comparison when employing the same conditions and adding 400 gallons of anhydrous ether to the ether reflux into line 20 over a period of one hour every 6 to 8 hours, 98.0 volume percent isopropanol was produced with a 6000 gal./hr. feed rate at 99.9 volume percent isopropanol at 4800 gal./hr.

In the above example even with the high feed rates no flooding or tower upsets of any kind were experienced. It will be noted that the added ether amounts to less than 1 volume percent based on ether feed rate to the dehydration tower; however, amounts of 5 volume percent or greater may be employed if desired. The larger amounts of anhydrous ether are generally not necessary under ordinary conditions. The anhydrous ether, in any event, should be added in an amount sufficient to permit a substantially constant high crude isopropanol feed rate.

What is claimed is:

1. In a method for dehydrating isopropanol wherein crude aqueous isopropanol is fractionally distilled in a fractionation zone at elevated temperatures and pressures and in the presence of large amounts of ether and wherein a gaseous ether-water mixture is recovered overhead, condensed and separated into ether and aqueous phases and wherein the ether phase is separated in a separation zone from said aqueous phase and recycled to the fractionation zone as either reflux, the improvement which comprises adding to said ether reflux anhydrous ether, said anhydrous ether being in addition to said recycled ether phase and constituting an amount of from 0.05 to 5.0 volume percent based on said recycled ether phase to permit a substantially constant high crude isopropanol feed rate.

2. A method in accordance with claim 1 wherein said anhydrous ether is added periodically.

3. A method in accordance with claim 1 wherein said anhydrous ether is added in an amount of from 0.05 to 0.15 volume percent based on said recycled ether phase.

4. An improved process for producing substantially pure isopropanol by azeotropic distillation with diethyl ether under pressures in the range of about 200–240 p.s.i.g., which comprises passing aqueous isopropanol and diethyl ether into an isopropanol dehydration zone, taking an overhead stream comprising principally ether and small amounts of water and other contaminants, withdrawing from the bottom of said zone a substantially anhydrous isopropanol product, separating ether from the overhead stream in a decanting zone and recycling said separated ether as reflux to the fractionation zone in an amount of from 5 to 16 volumes per volume of isopropanol feed together with a periodically added additional amount of anhydrous ether, the amount of said added anhydrous ether being from 0.05 to 5.0 volume percent based on the said ether reflux.

5. A method in accordance with claim 4 wherein said anhydrous ether is added in an amount of from 0.05 to 0.15 volume percent based on the said ether reflux.

References Cited in the file of this patent

UNITED STATES PATENTS

| 2,358,193 | Wentworth | Sept. 12, 1944 |
| 2,489,619 | Carlson et al. | Nov. 29, 1949 |
| 2,496,207 | Handlos et al. | Jan. 31, 1950 |
| 2,595,116 | Wilson | Apr. 29, 1952 |
| 2,787,586 | Catterall | Apr. 2, 1957 |
| 2,848,387 | Glazier et al. | Aug. 19, 1958 |